H. SLATER.
Carriage-Brake.
No. 17,700
Patented June 30, 1857
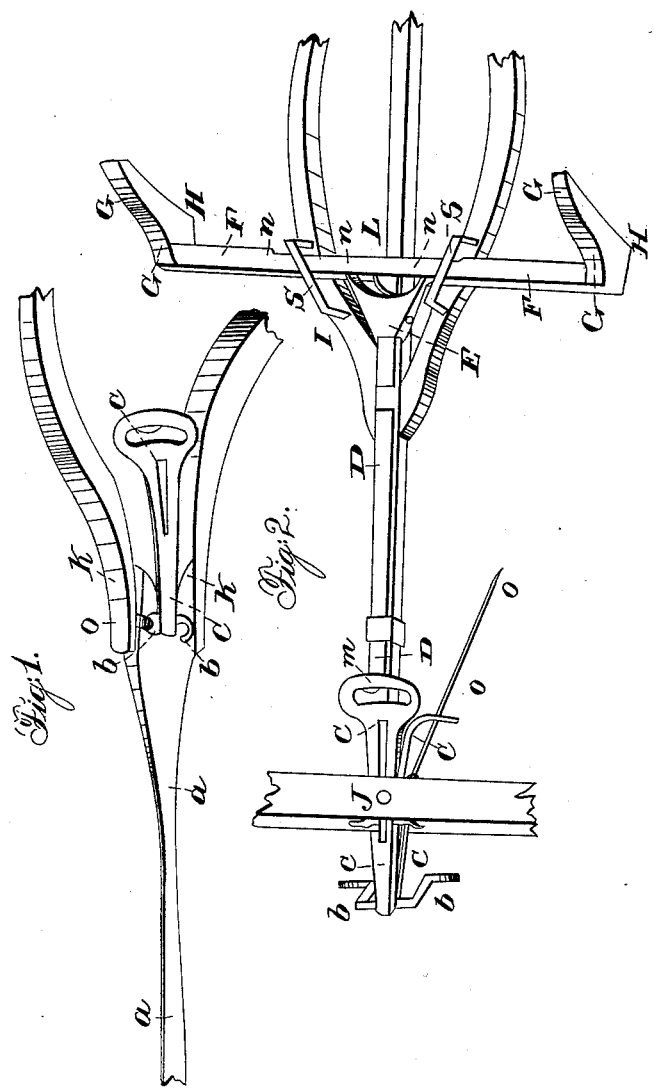
Inventor
Hugh Slater

UNITED STATES PATENT OFFICE.

HUGH SLATER, OF AUBURN, NEW YORK.

BRAKE FOR WAGONS.

Specification of Letters Patent No. 17,700, dated June 30, 1857.

*To all whom it may concern:*

Be it known that I, HUGH SLATER, of the city of Auburn, county of Cayuga, and State of New York, have invented a new and Improved Arrangement for Applying a Brake or Brakes to the Wheels of Wagons, Carriages, or other Four-Wheeled Vehicles Used on Common Roads; and I do hereby declare that the following is a full and exact description thereof, reference being had to the accompanying drawings and to the letters of reference marked thereon.

The nature of my invention consists in a peculiar arrangement and combination of devices, by the tongue, V shaped connection, bar or rod with its connections therewith and with the brake arms, substantially as herein described, by which the forward motion of the wheels may be retarded when required, and the backward motion not impeded.

To enable others skilled in the art to make and use my invention I will proceed to describe its construction and operation.

I construct my brakes in any of the known forms, and so adjust them as to bear, when required, upon the forward part of the rim or tread of the hind wheels in such form that the brakes operate upon the wheels when revolving forward or tending to make such forward revolution, by holding back upon the pole or tongue of the wagon, carriage or other vehicle, and are thrown off the wheels when the holding back ceases or when the wheels are made to revolve backward.

Drawing No. 1, shows an underside view of the pole or tongue, and its connections in the jaws of the hounds. *a, a*, represent the pole or tongue; *b, b*, the hinge connecting the pole or tongue with the jaws of the hounds K K.

Drawing No. 2, shows a view of the upper side. *c, c, c, c*, represent a connection in a V shape between the pole or tongue by means of the hinge *b, b*, and the main rod or bar of the brake. This V-shaped connection is made of iron, or steel, or other material of suitable size, to insure strength and durability, and takes hold of the hinge *b, b*, beneath the pole or tongue as shown in Drawing No. 1. The king bolt J as shown in Drawing No. 2 passes through it, in a slot of sufficient length to allow the necessary motion backward and forward of the brake rod or bar D, D. There is also a semicircular or oval slot in this V-shaped connection at *m* to allow of the short turning of the forward axle tree. A shoulder upon the rod or bar D, D, passes into this slot at *m*. The bar or rod D, D, rests upon the reach, and the reach receives the king bolt J through an eye in its forward end, between the leaves of the V-shaped connection.

The bar or rod D, D, may be made of iron or any other suitable material to insure strength and durability, and is banded to the reach in such manner as to hold it to its place, without preventing its sliding backward and forward. It has a connection E with the arm of the brakes. This connection may be made of sheet iron or other material of suitable size for strength and durability with lips turned down at the sides, and the bar or rod D, D, fastened to it, about midway of its length. This connection E is fastened to the arm F, F, at *n, n*, by rings and staples so near to the under side of the arm as to allow the motion of the bar or rod D, D, when pressed backward to turn over the arm F, F, when the wheels are revolving backward.

I represents a semicircular piece of wood or iron fastened to the arm F, F, and passing into a slot in the reach at L the object of which is to hold the arm F, F, and the brake heads G, G, G, G, in their proper places. This slot in the reach is to be of sufficient length to allow the requisite motion of the brake rod or bar backward and forward.

G, G, G, G represent the brake heads upon each end of the arm F, F.

*s, s*, represent guards to be made of iron or other suitable material and placed over the arms of the brakes to keep them in position.

The heel of the brake blocks H, H, are to be arranged to press the rim or tread of the wheels so low down as to exert the greatest resistance to the motion of the wheels, while moving forward or tending to move forward, and the least resistance to the turning over of the brake when the wheels are moving backward or tending to move backward.

A bar of iron or other suitable material to insure strength, represented by *o, o*, is fastened by ring and staple to the beam through which the king bolt passes, and is passed through a slot in the lower part of the V-shaped connection, to act as a hold back in going up hill with a load when required, and can be set or thrown up by the action of the horses or other power in backing or pulling forward.

What I claim as my invention is—

1. The peculiar arrangement and combination of devices by means of the tongue or pole a, a; the hinge b, b, the V-shaped connection c, c, c, c; the brake rod or bar D, D, and the connections with the brake arms, substantially as herein described.

2. The combination of the pole or tongue a, a, and stop bar o, o, with the sliding bar D, D, or its equivalent, whereby the stop is raised when the carriage is backed and lowered when it is moved forward, substantially as described.

In witness whereof, I have hereto set my hand this seventh day of February, one thousand eight hundred and fifty-seven.

HUGH SLATER.

Witnesses:
 THOMAS Y. HOW,
 A. J. HOCKLEY.